United States Patent
Shimizu et al.

(10) Patent No.: US 8,470,206 B2
(45) Date of Patent: Jun. 25, 2013

(54) METHOD OF PRODUCING ANODE MATERIAL

(75) Inventors: Kazuhiko Shimizu, Iwaki (JP); Hajime Komatsu, Iwaki (JP); Kenjiro Hara, Iwaki (JP); Michihisa Miyahara, Tokyo (JP)

(73) Assignee: Kureha Corporation (JP)

( * ) Notice: Subject to any disclaimer, the term of this patent is extended or adjusted under 35 U.S.C. 154(b) by 184 days.

(21) Appl. No.: 13/141,740

(22) PCT Filed: Dec. 14, 2009

(86) PCT No.: PCT/JP2009/070830
§ 371 (c)(1), (2), (4) Date: Jun. 23, 2011

(87) PCT Pub. No.: WO2010/073931
PCT Pub. Date: Jul. 1, 2010

(65) Prior Publication Data
US 2011/0253928 A1 Oct. 20, 2011

(30) Foreign Application Priority Data
Dec. 26, 2008 (JP) .................... 2008-331733

(51) Int. Cl.
*H01B 1/06* (2006.01)
*H01M 4/16* (2006.01)
*H01M 4/62* (2006.01)

(52) U.S. Cl.
USPC ............ 252/510; 429/212; 429/217

(58) Field of Classification Search
USPC .................. 252/510; 429/212, 217
See application file for complete search history.

(56) References Cited

U.S. PATENT DOCUMENTS
| | | |
|---|---|---|
| 5,451,477 A | 9/1995 | Omaru et al. |
| 5,772,974 A | 6/1998 | Ohashi et al. |
| 2007/0287068 A1 | 12/2007 | Shimizu et al. |
| 2009/0297953 A1 | 12/2009 | Shimizu et al. |

FOREIGN PATENT DOCUMENTS
| | | |
|---|---|---|
| EP | 627777 A2 | 12/1994 |
| EP | 726606 A1 | 8/1996 |
| EP | 1739771 A1 | 1/2007 |
| JP | 7-192724 A | 7/1995 |
| JP | 7-335262 A | 12/1995 |
| JP | 8-279358 A | 10/1996 |
| WO | 2005/098999 A1 | 10/2005 |
| WO | 2007/040007 A1 | 4/2007 |

OTHER PUBLICATIONS
International Search Report for International Application No. PCT/JP2009/070830 mailed Mar. 16, 2010 with English translation.

*Primary Examiner* — Mark Kopec
*Assistant Examiner* — Jaison Thomas
(74) *Attorney, Agent, or Firm* — Cantor Colburn LLP (57) ABSTRACT

There are provided a method of producing an anode material for a non-aqueous electrolyte secondary battery which is suitable for use in a high input/output current-type non-aqueous electrolyte secondary battery exemplified by a non-aqueous electrolyte secondary battery for a hybrid electric vehicle (HEV), has reduced irreversible capacity and superior charge-discharge efficiency, and an anode material obtained by the above production method.

A method of producing an anode material for a non-aqueous electrolyte secondary battery from a petroleum-based pitch material, comprising a tar removal step in which an infusibilized pitch having an oxygen content of 5 to 20 wt % is heated to a temperature of 480° C. to 700° C. while flowing an inert gas at the space velocity of 0 to 120 (min$^{-1}$).

4 Claims, 3 Drawing Sheets

METHOD OF PRODUCING ANODE MATERIAL

CROSS REFERENCE TO RELATED APPLICATIONS

This is a U.S. national stage application of International Application No. PCT/JP2009/070830, filed on 14 Dec. 2009. Priority under 35 U.S.C. 119(a) and 35 U.S.C. 365(b) is claimed from Japanese Application No. JP 2008-331733, filed 26 Dec. 2008, the disclosure of which is also incorporated herein by reference.

TECHNICAL FIELD

The present invention relates to a method of producing an anode material. In particular, the present invention relates to a simple method of producing an anode material.

BACKGROUND ART

As a secondary battery with high energy density, a non-aqueous electrolytic lithium secondary battery using a carbonaceous material as an anode is widely studied. While the demand for a nonaqueous electrolytic lithium secondary battery for use as a power supply of a mobile device is still increasing, a new use of a nonaqueous electrolytic lithium secondary battery as a battery of an electric vehicle such as an electric vehicle (EV) driven by a motor alone and a hybrid electric vehicle (HEV) using a combination of an internal combustion engine and a motor is actively developed.

A popularly-used constituent material of an anode of a lithium secondary battery is a carbon based material, and other examples include materials comprising a metallic element such as Zn, Al and Sn or a metalloid element such as Si, Ge, and Sb. As a carbon based material, non-graphitizable carbon (also called "hard carbon") having a potential capacity that the discharge capacity per gram of carbon is significantly higher than the theoretical discharge capacity of graphite, 372 mAh/g, is also widely used. Especially as a battery for an electric vehicle, non-graphitizable carbon has drawn great attention from the viewpoint of high input-output characteristics that high electric power is repeatedly supplied and received in a short period of time.

Non-graphitizable carbon using a petroleum-based or coal-based pitch as a raw material is proposed as suitable non-graphitizable carbon for use as a constituent material of an anode of a lithium secondary battery (Patent Documents 1 to 3). Typical, conventional steps of producing a desired anode material for a battery from a pitch material are shown in FIG. 1.

Figure 1:
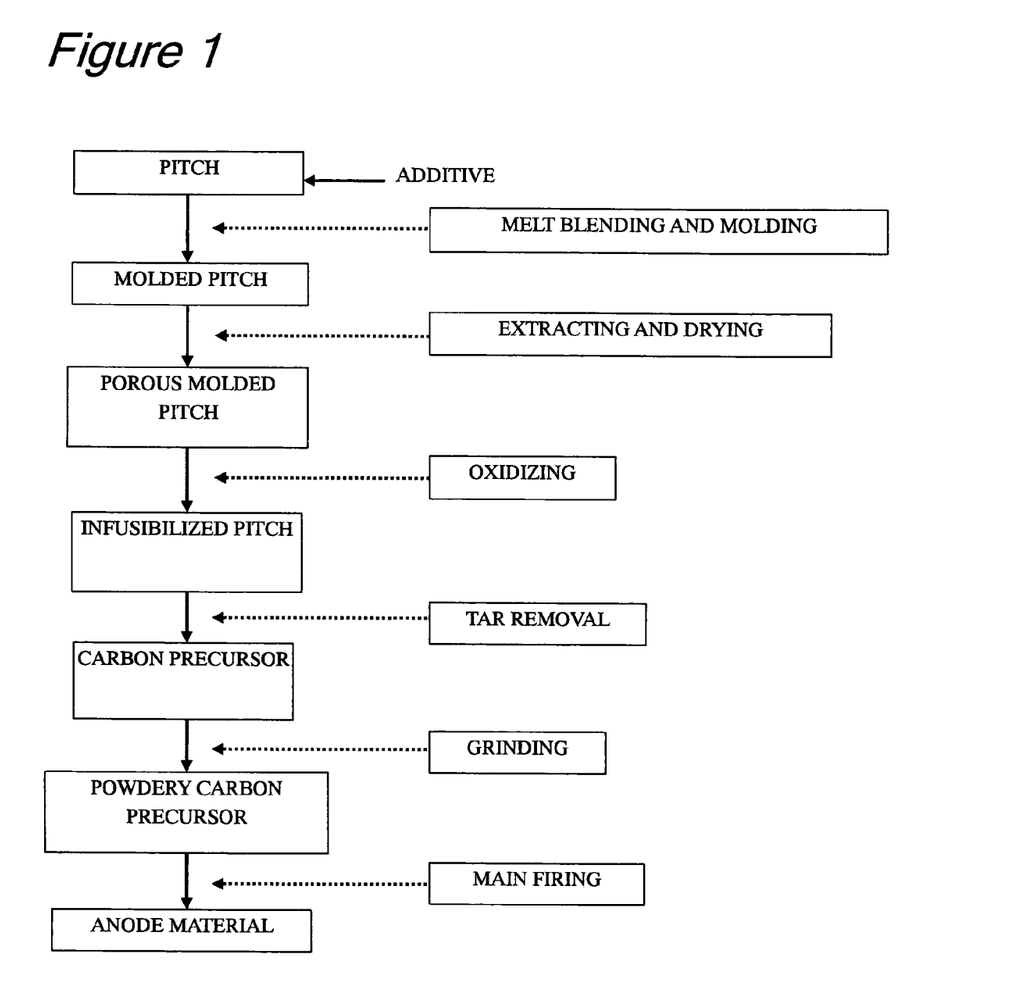
FIG. 1 shows a flowchart of a conventional process of producing an anode material.

As shown in FIG. 1, in the conventional process, an anode material is produced through the following steps of: melt blending a dicyclic or tricyclic aromatic compound having a boiling point of 200° C. or higher added as an additive to a petroleum-based or coal-based pitch material and molding to obtain a molded pitch ("melt blending and molding step"); extracting the additive from the molded pitch with a solvent having low solubility to the pitch and high solubility to the additive to obtain a porous molded pitch ("extracting and drying step"); oxidizing the porous molded pitch with an oxidizing agent such as air to obtain an infusibilized pitch ("oxidizing step"); heating the infusibilized pitch to 600° C. or 680° C. in an inert gas atmosphere (normal pressure) to remove an organic component (tar component) contained in the infusibilized pitch to obtain a carbon precursor having a low volatile content ("tar removal step"); grinding the carbon precursor to obtain a powdery carbon precursor ("grinding step"); and heat treating the powdery carbon precursor in an inert gas at about 800 to 1500° C. to carbonize the powdery carbon precursor ("heat treatment step").

It has been proposed that in the tar removal step, the pre-carbonization should be carried out in a nitrogen gas atmosphere at normal pressure at a temperature of 600° C. or 680° C. to thereby obtain a carbon precursor having a volatile content of 2% or lower. However, further studies of this step in more detail are still possible, and it has been desired to obtain a carbon material having further reduced irreversible capacity and improved charge-discharge efficiency.

CITATION LIST

Patent Documents

Patent Document 1: JP 8-279358 A
Patent Document 2: WO/2005/098999
Patent Document 3: WO/2007/04007

SUMMARY OF INVENTION

Technical Problem

A major object of the present invention is to provide a method of producing an anode material for a non-aqueous electrolyte secondary battery which is suitable for use especially in a high input/output current-type non-aqueous electrolyte secondary battery exemplified by a non-aqueous electrolyte secondary battery for a hybrid electric vehicle (HEV), has reduced irreversible capacity, and is excellent in charge-discharge efficiency, and to provide an anode material obtained by the production method.

Solution to Problem

In an attempt to solve the above problems, the present inventors conducted intensive and extensive studies. Consequently, the inventors found that heating an infusibilized pitch having an oxygen content of 5 to 20 wt % to a temperature of 480° C. to 700° C. while flowing no inert gas or flowing an inert gas at the space velocity of 120 (min$^{-1}$) or lower in the tar removing step provides an anode material for a non-aqueous electrolyte secondary battery with reduced irreversible capacity and improved charge-discharge efficiency.

Accordingly, the present invention provides a method of producing a carbon anode material which comprises a tar removal step of heating an infusibilized pitch having an oxygen content of 5 to 20 wt % to a temperature of 480° C. to 700° C. while flowing no inert gas or flowing an inert gas at the space velocity of 120 (min$^{-1}$) or lower. As used herein, the state "flowing no inert gas" indicates a state in which an inert gas in an initial atmosphere in the tar removal step is at normal pressure and no inert gas stream is proactively produced. The space velocity indicates the flow rate per space volume, and is defined by the following formula:

$$v = F/L (\min^{-1})$$

(F: flow rate (NL/min); L: volume (L) of a space occupied by a sample, which is a value calculated by dividing the sample mass M (g) after the removal of tar by the sample density ρ (g/cc) after the removal of tar and multiplying the quotient by 1000, L=1000×M/ρ).

The oxygen content of an infusibilized pitch which can be used in the method of the present invention is preferably 5 to 20 wt %, more preferably 6 to 19 wt %, even more preferably 8 to 12 wt %. If the oxygen content is lower than 5 wt %, the degree of infusibilization will be insufficient and the pitch will fuse, causing a problem of adhesion or the like. If the oxygen content is higher than 20 wt %, the irreversible capacity will increase and the initial charge-discharge efficiency will decrease significantly in the battery performance as an anode material.

The infusibilized pitch which is to be subjected to the tar removal step is preferably in the form of particles with an average particle size (median size) of 1 to 3000 μm, more preferably with an average particle size (median size) of 1 to 2000 μm, even more preferably with an average particle size (median size) of 1 to 1000 μm. If the average particle size is smaller than 1 μm, transport and handling the pitch, which is in the form of fine powder, are difficult during the steps of the producing process and the thermal treatment and, furthermore, there is also a problem that the powder tends to be spread and ejected to the outside of the reaction system. On the other hand, if the average particle size is greater than 3000 μm, there arises a problem that the infusibilization reaction will not progress to the inside of the particles.

The heating temperature in the tar removal step is preferably 480° C. to 700° C., more preferably 500° C. to 700° C. If the heating temperature is lower than 480° C., a large amount of volatile components will remain, causing a problem of aggregation of particles from tar in the subsequent heat treatment step. On the other hand, if the temperature is higher than 700° C., activation of the infusibilized pitch occurs especially in an atmosphere where steam is present, and the irreversible capacity in the battery material will increase. Thus, a temperature higher than 700° C. is not preferred.

In the case in which an inert gas is used in the tar removal step of the present invention, it is preferable to use nitrogen, helium, argon or the like as the inert gas in order to prevent oxidation of the carbon precursor during the heat treatment. However, any gas which does not react with the infusibilized pitch at a temperature not higher than the upper limit temperature of the tar removal step and is present in the form of a gas at a temperature not lower than the lower limit temperature of the tar removal step can be used as the inert gas. Examples of such an inert gas include nitrogen and noble gases (e.g., helium, neon, argon), organic hydrocarbon gases (e.g., methane, ethane, propane, butane, pentane) and gas, steam and the like which are produced by incomplete combustion of hydrogen.

It is not clear why an anode material for a non-aqueous electrolyte secondary battery having reduced irreversible capacity and superior charge-discharge efficiency can be obtained when the tar removal step is carried out under the conditions described above. The present inventors consider as follows. Specifically, although there was not any clear standard for the amount of an inert gas to be introduced, it was rather considered that volatile tar components were unnecessary and proactively ejected to the outside of the system by flowing a large amount of an inert gas. However, as in the present invention, when the space velocity of an inert gas is 0 (min$^{-1}$), i.e., no inert gas flows, or when a small amount of an inert gas flows so that the space velocity does not exceed 120 (min$^{-1}$), the infusibilized pitch is exposed to an atmosphere where the concentration of volatile gas generated from the infusibilized pitch at a temperature of 700° C. or below is high, which may result in formation of a surface structure of carbon which promotes smooth doping and dedoping of lithium ions while activation of the infusibilized pitch is inhibited.

The inert gas is preferably a gas which does not react with the infusibilized pitch at a temperature not higher than the upper limit temperature of the tar removal step and is present in the form of a gas at a temperature not lower than the lower limit temperature of the tar removal step; more preferably, the inert gas is nitrogen, helium, argon, or a mixed gas of hydrogen/butane produced by incomplete combustion and steam.

As to steps other than the tar removal step, a conventional step of producing an anode material can appropriately be used.

EXAMPLES

Items measured in the Examples and methods for the measurements are as follows.

<Oxygen Content>

Elemental analysis was conducted by a CHN analyzer. The oxygen content was calculated using the following formula:

$$100\% - C\% - H\% - N\%.$$

<Method of Preparing Sample Cell and Evaluation of Charging and Discharged Capacity>

Non-aqueous electrolyte secondary batteries were prepared using anode materials produced in the Examples and Comparative Examples, and characteristics thereof were evaluated. Although the carbonaceous material of the present invention is suitable for use as an anode of a non-aqueous solvent secondary battery, evaluation was conducted using lithium as a counter electrode in order to accurately evaluate the effects of the present invention, i.e., charging capacity, discharged capacity and irreversible capacity of an active material of the batteries, without being affected by variations in the performance of the counter electrode. Specifically, lithium secondary batteries were produced using lithium metal having stable properties as an anode (negative-electrode) and the anode materials produced in the Examples and Comparative Examples as a cathode (positive electrode), and characteristics thereof were evaluated.

Production of Cathode (Carbon Electrode)

To 95 parts by weight of each anode material (carbonaceous material) produced in the Examples and Comparative Examples and 5 parts by weight of polyvinylidene fluoride, N-methyl-2-pyrrolidone was added to obtain a paste. The paste was evenly applied onto a copper foil and then dried in a nitrogen gas atmosphere at 130° C. for 30 minutes. An electrode in the shape of a sheet was punched into the shape of a disk having a diameter of 15 mm, and the disk was pressed to obtain an electrode. The weight of the carbonaceous material (anode material) in the electrode was adjusted to about 20 mg. The press of the disk was conducted such that the filling rate of the carbonaceous material was about 67%.

Production of Anode (Lithium Electrode)

The production was carried out in a glove box in an Ar gas atmosphere. A stainless steel mesh disk having a diameter of 17 mm was spot welded in advance to an external cover of a 2016-sized coin battery can. Then, a thin metal lithium plate with a thickness of 0.5 mm punched into the shape of a disk having a diameter of 15 mm was pressure bonded to the stainless steel mesh disk.

With the cathode and the anode thus produced, a 2016-sized coin nonaqueous electrolytic lithium secondary battery was assembled in an Ar glove box, using an electrolytic solution prepared by adding $LiPF_6$ at the ratio of 1 mol/L to a mixed solvent in which ethylene carbonate, dimethyl carbonate and ethylmethyl carbonate were mixed at the volume ratio of 3:4:4, a microporous polypropylene membrane as a separator, and a polyethylene gasket.

Measurement of Charging Capacity, Discharged Capacity, Irreversible Capacity and Initial Charge-Discharge Efficiency In the lithium secondary battery having a structure as described above, the cathode (carbonaceous material) was doped and dedoped with lithium, and the capacity at that time was measured. The doping was carried out by a constant current/constant voltage method. Charging with constant electric current was carried out at the electric current density of 0.5 $mA/cm^2$ until the voltage dropped to 0 V. When the voltage dropped to 0 V, the electric current was attenuated while the constant voltage was maintained. When the electric current dropped to 20 μA, the charging was finished. The value calculated by dividing the quantity of electricity at that time by the weight of carbonaceous material used was defined as charging capacity expressing in terms of mAh/g.

Similarly, electric current was passed in the reverse direction to thereby dedope lithium with which the carbonaceous material had been doped. The dedoping was carried out at the electric current density of 0.5 $mA/cm^2$, and the terminal voltage of 1.5 V was used as the cutoff voltage. The quantity of electricity at that time was defined as discharged capacity expressing in terms of mAh/g.

The irreversible capacity is a difference between the charging capacity and the discharged capacity.

The initial charge-discharge efficiency is a value which indicates how effectively the active material was used. The initial charge-discharge efficiency was calculated by dividing the discharged capacity by the charging capacity and then multiplying the quotient by 100.

Each measurement of characteristics was carried out at 25° C.

<Measurement of Particle Size>

To about 0.1 g of a sample, three drops of a dispersant (cationic surfactant "SN dispersant 7347-C" (San Nopco Limited)) was added and well blended with the sample. Then, 30 ml of pure water was added and dispersed using an ultrasonic washer for about 2 minutes, and thereafter the particle size distribution within the particle size range of 0.5 to 3000 μm was determined using a particle size distribution analyzer (Shimadzu Corporation, "SALD-3000J"). From the particle size distribution, the particle size at which the cumulative volume was 50% was determined as the average particle size Dv50 (μm).

<Measurement of True Density of Anode Material Precursor>

In accordance with the method specified in JIS R7211, the true density ($\rho_B$) was measured at 30° C. using butanol as a substitution medium.

<Tar Removal Step, Heat Treatment Step, and Evaluation of Battery Performance>

An anode material for a lithium ion secondary battery was produced using a petroleum pitch as a raw material through the following steps: oxidation→tar removal→grinding→heat treatment. In the Examples and Comparative Examples, experiments were performed on infusibilized pitches of six different oxygen content levels by changing tar removal conditions, in order to determine the effects of the oxygen content and particle size of the infusibilized pitches to be subjected to the tar removal step and the atmosphere of treatment in the tar removal step on the performance of the batteries. The term "thin layer under an air stream" refers to a thin layer of powder formed on a support substrate. In an actual production apparatus, a fluidized bed is suitable as a structure for proactively removing tar components produced. However, in the case of powder, the powder may be dispersed. Thus, in the above experiments, a thin layer was used a simulated fluidized bed. In a case of particles having an average particle size (median size) of 500 to 900 μm, the particles were ground into powder with an average particle size (median size) of 10 μm after the tar removal treatment and then subjected to the heat treatment. The irreversible capacity, charging capacity, discharge capacity and initial charge-discharge efficiency of the respective samples thus obtained were measured. An anode material for a lithium ion secondary battery having lower irreversible capacity, higher charging capacity, higher discharged capacity, and higher initial charge-discharge efficiency is judged to have greater performance.

Example 1

Tar Removal Step: Space Velocity 0 ($min^{-1}$)

In a cylindrical graphite crucible having an inside diameter of 80 mm and a height of 80 mm, 191.5 g of infusibilized powdery pitch having an oxygen content of 18.7 wt % and an average particle size (median size) of 10 μm was charged, and the crucible was covered with a graphite plate and sealed such that gas outside the crucible would not enter the crucible. This vessel was placed at a central area of a horizontal cylindrical heating furnace which had an inside diameter of 230 mm and a length of 790 mm and was filled with normal-pressure nitrogen gas. The pitch was heated to 680° C. at the heating rate of 250° C./h while maintaining the nitrogen atmosphere in the heating furnace, and thereafter the pitch was maintained at 680° C. for 1 hour and tar removal treatment was carried out, whereby 142.6 g of an anode material precursor was obtained.

<Heat Treatment Step>

Ten grams of the anode material precursor thus obtained was deposited on an alumina plate such that the resulting deposit layer had a height of 2 mm, and then the alumina plate was placed in a horizontal tubular furnace having a diameter of 100 mm. The precursor was heated to 1200° C. at the rate of 250° C./h while flowing 10 L of nitrogen gas per minute, and thereafter maintained at 1200° C. for 1 hour, whereby an anode material (carbonaceous material) was produced.

Example 2

Tar Removal Step: Space Velocity 0 ($min^{-1}$)

In a cylindrical graphite crucible having an inside diameter of 80 mm and a height of 80 mm, 351.1 g of an infusibilized porous molded pitch having an oxygen content of 18.7 wt % and an average particle size (median size) of 700 μm was placed, and the crucible was covered with a graphite plate and sealed such that gas outside the crucible would not enter the crucible. This vessel was placed at a central area of a horizontal cylindrical heating furnace which had an inside diameter of 230 mm and a length of 790 mm and was filled with normal-pressure nitrogen gas. The pitch was heated to 680°

C. at the heating rate of 250° C./h while maintaining the nitrogen atmosphere in the heating furnace, and thereafter the pitch was maintained at 680° C. for 1 hour and tar removal treatment was carried out, whereby 253.2 g of an anode material precursor was obtained. This anode material precursor was ground into powder having an average particle size (median size) of 10 μm.

<Heat Treatment Step>

Ten grams of the anode material precursor thus obtained was deposited on an alumina plate such that the resulting deposit layer had a height of 2 mm, and then the alumina plate was placed in a horizontal tubular furnace having a diameter of 100 mm. The precursor was heated to 1200° C. at the rate of 250° C./h while flowing 10 L of nitrogen gas per minute, and thereafter maintained at 1200° C. for 1 hour, whereby an anode material (carbonaceous material) was produced.

Conditions under which the anode material of the present example was treated and the results of measurement of characteristics are shown in Table 1.

Example 3

Tar Removal Step: Space Velocity 19 (min$^{-1}$)

Using a fluid-bed type heating device, 100,000 g of infusibilized porous molded pitch having an oxygen content of 18.7 wt % and an average particle size (median size) of 700 μm was heated to 680° C. at the heating rate of 600° C./hr while flowing an inert gas at the rate of 1069 NL/min, and then the pitch was maintained at the above temperature for 1 hour, whereby an anode material precursor was produced. The inert gas was a gas in which steam was mixed at the volume ratio of 2:8 with an exhaust gas from combustion of a mixed gas of butane and hydrogen having the butane to hydrogen weight ratio of 57:43, at the fuel to air ratio of 0.8. The anode material precursor thus obtained was 80,666 g. The anode material precursor was ground into powder having an average particle size (median size) of 9 μm.

<Heat Treatment Step>

Ten grams of the anode material precursor thus obtained was deposited on an alumina plate such that the resulting deposit layer had a height of 2 mm, and then the alumina plate was placed in a horizontal tubular furnace having a diameter of 100 mm. The precursor was heated to 1200° C. at the rate of 250° C./h while flowing 10 L of nitrogen gas per minute, and then maintained at 1200° C. for 1 hour, whereby an anode material (carbonaceous material) was produced.

Conditions under which the anode material obtained in this example was treated and the results of measurement of characteristics are shown in Table 1.

Example 4

Tar Removal Step: Space Velocity 100 (min$^{-1}$)

In a fluid-bed type cylindrical heating device having an inside diameter of 50 mm and a height of 1000 mm, 100.0 g of infusibilized porous molded pitch having an oxygen content of 18.7 wt % and an average particle size (median size) of 700 μm was placed. The pitch was heated to 680° C. at the heating rate of 250° C./h while flowing normal-pressure nitrogen gas from a lower part of the vessel at the flow rate of 5 NL/min, and thereafter the pitch was maintained at 680° C. for 1 hour and tar removal treatment was carried out, whereby 71.7 g of an anode material precursor was obtained. The anode material precursor was ground into powder having an average particle size (median size) of 9 μm.

<Heat Treatment Step>

Ten grams of the anode material precursor thus obtained was deposited on an alumina plate such that the resulting deposit layer had a height of 2 mm, and then the alumina plate was placed in a horizontal tubular furnace having a diameter of 100 mm. The precursor was heated to 1200° C. at the rate of 250° C./h while flowing 10 L of nitrogen gas per minute, and thereafter maintained at 1200° C. for 1 hour, whereby an anode material (carbonaceous material) was produced.

Conditions under which the anode material obtained in this example was treated and the results of measurement of characteristics are shown in Table 1.

Example 5

The procedure of Example 1 was repeated, except that the oxygen content of infusibilized pitch was changed to 6.4 wt %. Conditions under which an anode material obtained in this example was treated and the results of measurement of characteristics are shown in Table 1.

Example 6

The procedure of Example 1 was repeated, except that the oxygen content of infusibilized pitch was changed to 8.2 wt %. Conditions under which an anode material obtained in this example was treated and the results of measurement of characteristics are shown in Table 1.

Example 7

The procedure of Example 1 was repeated, except that the oxygen content of infusibilized pitch was changed to 10.9 wt %. Conditions under which an anode material obtained in this example was treated and the results of measurement of characteristics are shown in Table 1.

Example 8

The procedure of Example 2 was repeated, except that the oxygen content of infusibilized pitch was changed to 6.4 wt %. Conditions under which an anode material obtained in this example was treated and the results of measurement of characteristics are shown in Table 1.

Example 9

The procedure of Example 2 was repeated, except that the oxygen content of infusibilized pitch was changed to 8.2 wt %. Conditions under which an anode material obtained in this example was treated and the results of measurement of characteristics are shown in Table 1.

Example 10

The procedure of Example 2 was repeated, except that the oxygen content of infusibilized pitch was changed to 10.9 wt %. Conditions under which an anode material obtained in this example was treated and the results of measurement of characteristics are shown in Table 1.

Example 11

Tar Removal Step: Space Velocity 0 (min$^{-1}$)

In a cylindrical graphite crucible having an inside diameter of 80 mm and a height of 80 mm, 130.7 g of infusibilized powdery pitch having an oxygen content of 10.9 wt % and an average particle size (median size) of 9 μm was placed, and the crucible was covered with a graphite plate and sealed such that gas outside the crucible would not enter the crucible. This vessel was placed at a central area of a horizontal cylindrical heating furnace which had an inside diameter of 230 mm and a length of 790 mm and was filled with normal-pressure nitrogen gas. The pitch was heated to 500° C. at the heating rate of 250° C./h while maintaining the nitrogen atmosphere in the heating furnace, and thereafter the pitch was maintained at 500° C. for 1 hour and tar removal treatment was carried out, whereby 111.8 g of an anode material precursor was obtained.

<Heat Treatment Step>

Ten grams of the anode material precursor thus obtained was deposited on an alumina plate such that the resulting deposit layer had a height of 2 mm, and then the alumina plate was placed in a horizontal tubular furnace having a diameter of 100 mm. The precursor was heated to 1200° C. at the rate of 250° C./h while flowing 10 L of nitrogen gas per minute, and thereafter maintained at 1200° C. for 1 hour, whereby an anode material (carbonaceous material) was produced. Conditions under which the anode material obtained in this example was treated and the results of measurement of characteristics are shown in Table 1.

Example 12

Tar Removal Step: Space Velocity 0 (min$^{-1}$)

In a cylindrical graphite crucible having an inside diameter of 80 mm and a height of 80 mm, 309.2 g of infusibilized porous molded pitch having an oxygen content of 10.9 wt % and an average particle size (median size) of 700 μm was placed, and the crucible was covered with a graphite plate and sealed such that gas outside the crucible would not enter the crucible. This vessel was placed at a central area of a horizontal cylindrical which had furnace having an inside diameter of 230 mm and a length of 790 mm and was filled with normal-pressure nitrogen gas. The pitch was heated to 500° C. at the heating rate of 250° C./h while the nitrogen atmosphere in the heating furnace was maintained, and thereafter the pitch was maintained at 500° C. for 1 hour and tar removal treatment was carried out, whereby 269.0 g of an anode material precursor was obtained. The anode material precursor was ground into powder having an average particle size (median size) of 9 μm.

<Heat Treatment Step>

Ten grams of the anode material precursor thus obtained was deposited on an alumina plate such that the resulting deposit layer had a height of 2 mm, and then the alumina plate was placed in a horizontal tubular furnace having a diameter of 100 mm. The precursor was heated to 1200° C. at the rate of 250° C./h while flowing 10 L of nitrogen gas per minute, and thereafter maintained at 1200° C. for 1 hour, whereby an anode material (carbonaceous material) was produced. Conditions under which the anode material obtained in this example was treated and the results of measurement of characteristics are shown in Table 1.

Comparative Example 1

Tar Removal Step: Space Velocity 485 (min$^{-1}$)

On a flat graphite plate having a length of 230 mm, a width of 500 mm and a thickness of 2 mm, 200.0 g of infusibilized powdery pitch having an oxygen content of 18.7 wt % and an average particle size (median size) of 10 μm was evenly spread, and then the plate was placed horizontally at a central area of a horizontal cylindrical heating furnace having an inside diameter of 230 mm and a length of 790 mm. The pitch was heated to 680° C. at the heating rate of 250° C./h while flowing normal-pressure nitrogen to the heating furnace at the flow velocity of 50 NL/min (space velocity: 485/min), and thereafter the pitch was maintained at 680° C. for 1 hour and tar removal treatment was carried out, whereby 147.4 g of an anode material precursor was obtained.

<Heat Treatment Step>

Ten grams of the anode material precursor thus obtained was deposited on an alumina plate such that the resulting deposit layer had a height of 2 mm, and then the alumina plate was placed in a horizontal tubular furnace having a diameter of 100 mm. The precursor was heated to 1200° C. at the rate of 250° C./h while flowing 10 L of nitrogen gas per minute, and thereafter maintained at 1200° C. for 1 hour, whereby an anode material (carbonaceous material) was produced. Conditions under which the anode material obtained in this comparative example was treated and the results of measurement of characteristics are shown in Table 1.

Comparative Example 2

Tar Removal Step: Space Velocity 270 (min$^{-1}$)

In a fluid-bed type cylindrical heating device having an inside diameter of 100 mm and a height of 300 mm, 300.0 g of infusibilized porous molded pitch having an oxygen content of 18.7 wt % and an average particle size (median size) of 700 μm was placed. The pitch was heated to 680° C. at the heating rate of 250° C./h while flowing normal-pressure nitrogen gas from a lower part of the vessel at the flow rate of 40 NL/min, and thereafter the pitch was maintained at 680° C. for 1 hour and tar removal treatment was carried out, whereby 211.5 g of an anode material precursor was obtained. The anode material precursor was ground into powder having an average particle size (median size) of 9 μm.

<Heat Treatment Step>

Ten grams of the anode material precursor thus obtained was deposited on an alumina plate such that the resulting deposit layer had a height of 2 mm, and then the alumina plate was placed in a horizontal tubular furnace having a diameter of 100 mm. The precursor was heated to 1200° C. at the rate of 250° C./h while flowing 10 L of nitrogen gas per minute, and thereafter maintained at 1200° C. for 1 hour, whereby an anode material (carbonaceous material) was produced. Conditions under which the anode material obtained in this comparative example was treated and the results of measurement of characteristics are shown in Table 1.

Comparative Example 3

The procedure of Comparative Example 1 was repeated, except that the oxygen content of infusibilized pitch was changed to 8.2 wt % and the temperature at which the pitch was maintained in the heat treatment was changed to 1000° C. Conditions under which an anode material obtained in this comparative example was treated and the results of measurement of characteristics are shown in Table 1.

Comparative Example 4

The procedure of Comparative Example 1 was repeated, except that the oxygen content of infusibilized pitch was changed to 10.9 wt % and the temperature at which the pitch was maintained in the heat treatment was changed to 1000° C. Conditions under which an anode material obtained in this comparative example was treated and the results of measurement of characteristics are shown in Table 1.

Comparative Example 5

The procedure of Comparative Example 2 was repeated, except that the oxygen content of infusibilized pitch was changed to 8.2 wt % and the temperature at which the pitch was maintained in the heat treatment was changed to 1000° C. Conditions under which an anode material obtained in this comparative example was treated and the results of measurement of characteristics are shown in Table 1.

Comparative Example 6

The procedure of Comparative Example 2 was repeated, except that the oxygen content of infusibilized pitch was changed to 10.9 wt % and the temperature at which the pitch was maintained in the heat treatment was changed to 1000° C. Conditions under which an anode material obtained in this comparative example was treated and the results of measurement of characteristics are shown in Table 1.

Comparative Example 7

The procedure of Example 11 was repeated, except that the temperature of the tar removal treatment was changed from 500° C. to 470° C.; as a result, particles were aggregated during the heat treatment and, thus, a suitable material for use could not be produced. Conditions of treatment in this comparative example are shown in Table 1.

Comparative Example 8

The procedure of Example 11 was repeated, except that the temperature of the tar removal treatment was changed from 500° C. to 710° C. Conditions under which an anode material obtained in this comparative example was treated and the results of measurement of characteristics are shown in Table 1.

Comparative Example 9

The procedure of Example 11 was repeated, except that the oxygen content of infusibilized pitch was changed to 2.7 wt %. Conditions under which an anode material obtained in this comparative example was treated and the results of measurement of characteristics are shown in Table 1.

Comparative Example 10

The procedure of Example 11 was repeated, except that the oxygen content of infusibilized pitch was changed to 21.5 wt %. Conditions under which an anode material obtained in this comparative example was treated and the results of measurement of characteristics are shown in Table 1.

TABLE 1

Tar removal conditions and results of evaluation of battery performance

| | Tar removal conditions | | | | | | | | | |
|---|---|---|---|---|---|---|---|---|---|---|
| | Oxygen content wt % | Inert gas flow rate L/min | Sample volume L | Inert gas space velocity/min | Amount of infusibilized pitch charged g | Average particle size in tar removal treatment μm | Temperature in tar removal treatment ° C. | Amount recovered g | Yield of tar removal % | Heat treatment condition |
| Example 1 | 18.7 | 0 | 0.100 | 0 | 191.5 | 10 | 680 | 142.6 | 74.5 | 1200° C. × 1 h |
| Example 2 | 18.7 | 0 | 0.177 | 0 | 351.1 | 700 | 680 | 253.2 | 72.1 | 1200° C. × 1 h |
| Example 3 | 18.7 | 1069 | 56 | 19 | 100000 | 700 | 680 | 80666 | 80.7 | 1200° C. × 1 h |
| Example 4 | 18.7 | 5 | 0 | 100 | 100 | 700 | 680 | 71.7 | 71.7 | 1200° C. × 1 h |
| Example 5 | 6.4 | 0 | 0.087 | 0 | 152.4 | 10 | 680 | 124.6 | 81.8 | 1200° C. × 1 h |
| Example 6 | 8.2 | 0 | 0.085 | 0 | 149.4 | 10 | 680 | 121.8 | 81.5 | 1200° C. × 1 h |
| Example 7 | 10.9 | 0 | 0.088 | 0 | 155.0 | 10 | 680 | 125.4 | 80.9 | 1200° C. × 1 h |
| Example 8 | 6.4 | 0 | 0.199 | 0 | 349.7 | 700 | 680 | 284.9 | 81.5 | 1200° C. × 1 h |
| Example 9 | 8.2 | 0 | 0.191 | 0 | 336.6 | 700 | 680 | 273.5 | 81.3 | 1200° C. × 1 h |
| Example 10 | 10.9 | 0 | 0.191 | 0 | 341.4 | 700 | 680 | 273.0 | 80.0 | 1200° C. × 1 h |
| Example 11 | 10.9 | 0 | 0.078 | 0 | 130.7 | 9 | 500 | 111.8 | 85.5 | 1200° C. × 1 h |
| Example 12 | 10.9 | 0 | 0.188 | 0 | 309.2 | 700 | 500 | 269.0 | 87.0 | 1200° C. × 1 h |
| Comparative Example 1 | 18.7 | 50 | 0.103 | 485 | 200.0 | 10 | 680 | 147.4 | 73.7 | 1200° C. × 1 h |
| Comparative Example 2 | 18.7 | 40 | 0.148 | 270 | 300.0 | 700 | 680 | 211.5 | 70.5 | 1200° C. × 1 h |
| Comparative Example 3 | 8.2 | 50 | 0.109 | 458 | 200.0 | 10 | 680 | 156.2 | 78.1 | 1000° C. × 1 h |
| Comparative Example 4 | 10.9 | 50 | 0.110 | 456 | 200.0 | 10 | 680 | 156.8 | 78.4 | 1000° C. × 1 h |

TABLE 1-continued

Tar removal conditions and results of evaluation of battery performance

| | | | | | | | | | | |
|---|---|---|---|---|---|---|---|---|---|---|
| Comparative Example 5 | 8.2 | 40 | 0.165 | 243 | 300.0 | 700 | 680 | 235.8 | 78.6 | 1000° C. × 1 h |
| Comparative Example 6 | 10.9 | 40 | 0.165 | 243 | 300.0 | 700 | 680 | 235.8 | 78.6 | 1000° C. × 1 h |
| Comparative Example 7 | 10.9 | 0 | 0.078 | 0 | 130.7 | 9 | 470 | 112.5 | 86.1 | 1200° C. × 1 h |
| Comparative Example 8 | 10.9 | 0 | 0.078 | 0 | 130.7 | 9 | 710 | 102.7 | 78.6 | 1200° C. × 1 h |
| Comparative Example 9 | 2.7 | 0 | 0.078 | 0 | 131.4 | 9 | 500 | 113.1 | 86.1 | 1200° C. × 1 h |
| Comparative Example 10 | 21.5 | 0 | 0.078 | 0 | 130.5 | 9 | 500 | 108.2 | 82.9 | 1200° C. × 1 h |

| | Evaluation of battery performance (constant current/constant voltage method) | | | | | |
|---|---|---|---|---|---|---|
| | Charging capacity mAh/g | Discharged capacity mAh/g | Irreversible capacity mAh/g | Initial charge-discharge efficiency % | Yield of heat treatment % | Total yield % |
| Example 1 | 525.6 | 453.9 | 71.7 | 86.4 | 92.6 | 69.0 |
| Example 2 | 550.1 | 474.5 | 75.6 | 86.3 | 91.5 | 66.0 |
| Example 3 | 532.6 | 457.3 | 75.3 | 85.9 | 88.7 | 71.6 |
| Example 4 | 543.4 | 464.6 | 78.8 | 85.5 | 91.9 | 65.9 |
| Example 5 | 516.4 | 456.8 | 59.6 | 88.5 | 92.3 | 75.4 |
| Example 6 | 523.5 | 462.6 | 60.9 | 88.4 | 92.0 | 75.0 |
| Example 7 | 533.1 | 470.2 | 62.9 | 88.2 | 91.3 | 73.9 |
| Example 8 | 488.1 | 431.0 | 57.1 | 88.3 | 91.4 | 74.5 |
| Example 9 | 517.3 | 457.2 | 60.1 | 88.4 | 91.0 | 74.0 |
| Example 10 | 516.1 | 454.2 | 61.9 | 88.0 | 91.8 | 73.4 |
| Example 11 | 518.5 | 455.0 | 63.5 | 87.8 | 86.9 | 74.3 |
| Example 12 | 533.0 | 458.7 | 74.2 | 86.1 | 85.7 | 74.6 |
| Comparative Example 1 | 541.7 | 457.1 | 84.6 | 84.4 | 90.4 | 66.6 |
| Comparative Example 2 | 542.3 | 456.8 | 85.5 | 84.2 | 92.2 | 65.0 |
| Comparative Example 3 | 612.4 | 489.3 | 123.1 | 79.9 | 92.7 | 72.4 |
| Comparative Example 4 | 617.9 | 490.0 | 127.9 | 79.3 | 92.8 | 72.8 |
| Comparative Example 5 | 609.7 | 484.1 | 125.6 | 79.4 | 92.8 | 72.9 |
| Comparative Example 6 | 613.3 | 483.9 | 129.4 | 78.9 | 92.4 | 72.6 |
| Comparative Example 7 | Particles were aggregated during heat treatment | | | | | |
| Comparative Example 8 | 483.0 | 384.0 | 99.0 | 79.5 | 87.6 | 68.9 |
| Comparative Example 9 | 376.3 | 305.4 | 70.9 | 81.2 | 85.7 | 73.8 |
| Comparative Example 10 | 537.0 | 449.2 | 87.8 | 83.6 | 84.0 | 69.6 |

The effects of tar removal conditions on the electrochemical characteristics of the materials which used the infusibilized pitches of the same oxygen content (18.7 wt %) as a starting material were compared; from Table 1 it is understood that by carrying out the tar removal treatment under conditions of low inert gas space velocity, the irreversible capacity was decreased and the charge-discharge efficiency was improved, whereby a material having preferred characteristics was obtained.

Figure 2:
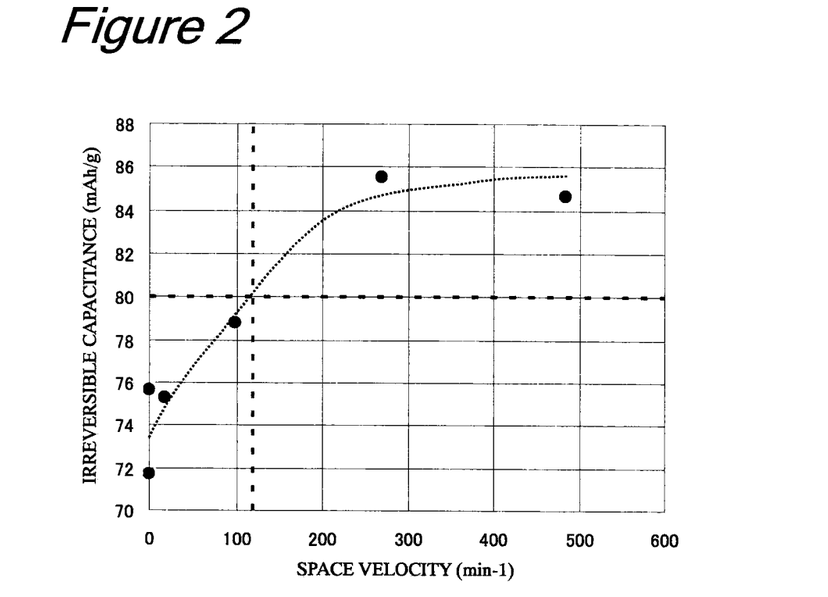
FIG. 2 is a graph showing the relation between the space velocity and the irreversible capacity.
Figure 3:
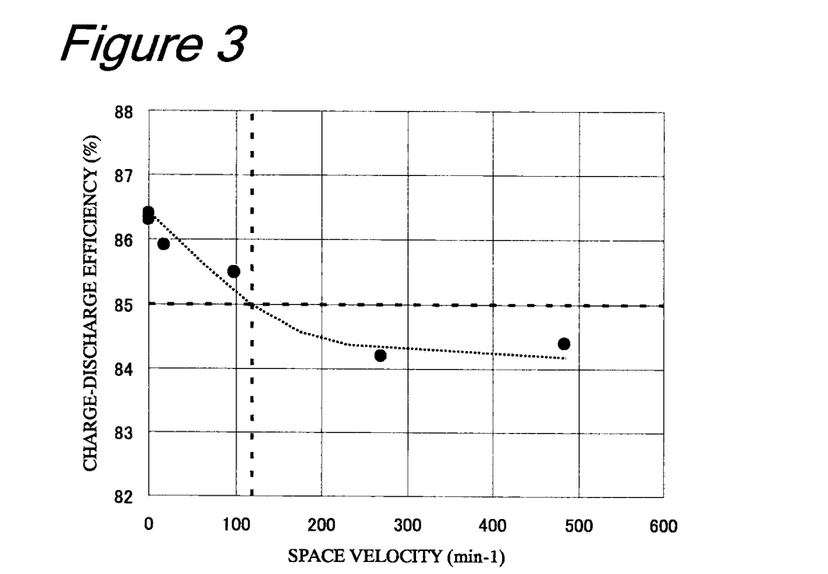
FIG. 3 is a graph showing the relation between the space velocity and the initial charge-discharge efficiency.

FIG. 2 shows the relation of the irreversible capacity to the space velocity and FIG. 3 shows the relation of the initial charge-discharge efficiency to the space velocity in the cases in which the infusibilized pitches having an oxygen content of 18.7 wt % were subjected to the tar removal treatment at different space velocities (corresponding to Examples 1, 2, 3 and 4 and Comparative Examples 1 and 2). From FIG. 2 it is understood that at a space velocity of 120 (min$^{-1}$) or lower the irreversible capacity had a tendency to decrease to 80 mAh/g or lower. From FIG. 3 it is understood that at a space velocity of 120 (min$^{-1}$) or lower the charge-discharge efficiency had a tendency to increase to 85% or higher.

Figure 4:
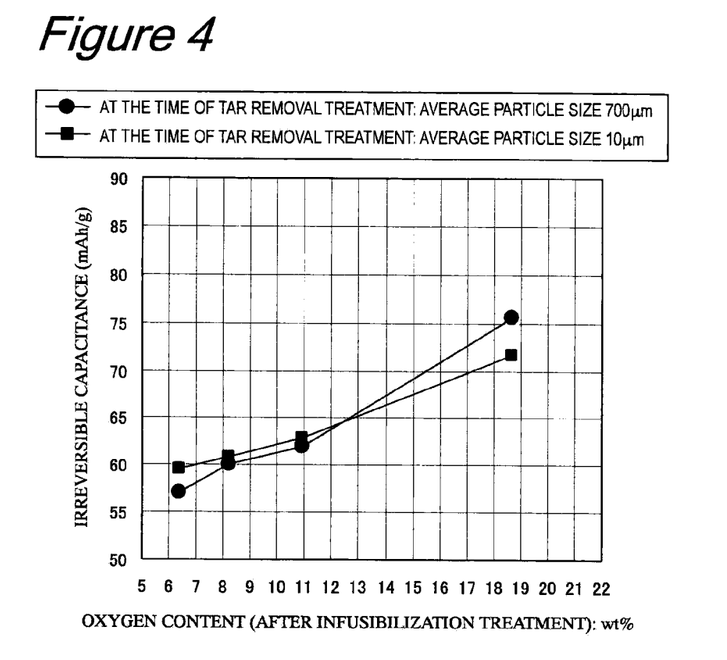
FIG. 4 is a graph showing the results of measurement of irreversible capacity.
Figure 5:
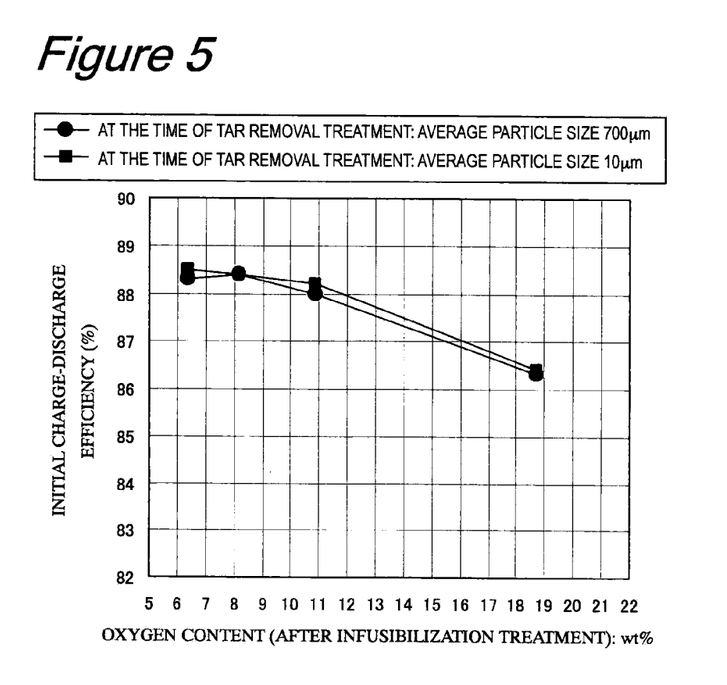
FIG. 5 is a graph showing the results of measurement of initial charge-discharge efficiency.

The results of measurement of irreversible capacity are shown in FIG. 4 and the results of initial charge-discharge efficiency are shown in FIG. 5 in the cases in which the infusibilized pitches having different particle sizes, 10 μm and 700 μm, were subjected to the tar removal treatment at the space velocity of 0 (min$^{-1}$) (corresponding to Examples 1, 2, 5, 6, 7, 8, 9 and 10). It is understood that regardless of the particle size at the time of the tar removal treatment, the irreversible capacity was more decreased and the initial charge-discharge efficiency was more improved at a lower oxygen content of the infusibilized pitches.

Accordingly, it is considered that in order to improve the performance as a carbon material for a non-aqueous electrolyte secondary battery, it is desirable to carry out the tar removal treatment under an air stream at a low gas space velocity using an infusibilized pitch having a lower oxygen content.

The invention claimed is:

1. A method of producing an anode material, comprising a tar removal step in which an infusibilized pitch is heated to a temperature of 480° C. to 700° C. while flowing an inert gas at a space velocity of 0 to 120 (min$^{-1}$).

2. The method of claim 1, wherein the infusibilized pitch subjected to the tar removal step has an oxygen content of 5 to 20 wt %.

3. The method of claim 1, wherein the inert gas is a gas which does not react with the infusibilized pitch at a temperature which is not higher than an upper limit temperature of the tar removal step and is present in the state of a gas at a temperature which is not lower than a lower limit temperature of the tar removal step.

4. The method of claim 3, wherein the inert gas is nitrogen, helium, argon or a mixed gas of incomplete combustion gas of hydrogen and butane and steam.

* * * * *